United States Patent [19]

Dahlstrom et al.

[11] Patent Number: 5,006,349

[45] Date of Patent: * Apr. 9, 1991

[54] PROCESS FOR PRODUCING A PROTEIN PRODUCT

[75] Inventors: Donald Dahlstrom, Fairbault; Stephen Dybing, Fridley; Barney J. Gaffney, Stillwater, all of Minn.

[73] Assignee: Land O'Lakes, Inc., Arden Hills, Minn.

[*] Notice: The portion of the term of this patent subsequent to Jun. 23, 2004 has been disclaimed.

[21] Appl. No.: 210,214

[22] Filed: Jun. 17, 1988

Related U.S. Application Data

[63] Continuation of Ser. No. 823,304, Jan. 28, 1986, abandoned.

[51] Int. Cl.$^5$ .................. A23C 9/13; A23C 19/02; A23J 1/00
[52] U.S. Cl. .................. 426/39; 426/40; 426/42; 426/46; 426/43; 426/52; 426/238; 426/656; 426/657; 426/582; 426/583; 426/634; 426/580
[58] Field of Search .................. 426/36, 52, 40, 42, 426/43, 39, 46, 238, 580, 582, 656, 657, 583, 295, 34, 516, 637

[56] References Cited

U.S. PATENT DOCUMENTS

| | | | |
|---|---|---|---|
| Re. 25,324 | 1/1963 | Cottell et al. | 259/1 |
| 2,982,654 | 5/1961 | Hammond | 99/116 |
| 3,172,767 | 3/1965 | Foster, Jr. | 99/116 |
| 3,176,964 | 4/1965 | Cottell et al. | 259/1 |
| 3,216,705 | 11/1965 | Struck | 259/4 |
| 3,278,165 | 10/1966 | Gaffney | 259/1 |
| 3,285,579 | 11/1966 | Guerin | 259/4 |
| 3,298,836 | 1/1967 | Ernstrom | 99/116 |
| 3,340,066 | 9/1967 | Corbin, Jr. et al. | 99/54 |
| 3,356,345 | 12/1967 | Goodman | 259/4 |
| 3,359,116 | 12/1967 | Little | 99/54 |
| 3,399,031 | 8/1968 | McCarthy | 23/107 |
| 3,406,076 | 10/1968 | Little | 99/116 |
| 3,408,050 | 10/1968 | Jacobs, III | 259/4 |
| 3,410,529 | 11/1968 | Simonetti | 259/4 |
| 3,620,768 | 11/1971 | Corbin, Jr. | 99/116 |
| 3,792,171 | 2/1974 | Little | 426/38 |
| 3,845,226 | 10/1974 | Goujard | 426/239 |
| 3,882,250 | 5/1975 | Loter et al. | 426/39 |
| 3,899,595 | 8/1975 | Stenne | 426/238 |
| 3,926,413 | 12/1975 | D'Urso | 259/4 |
| 3,953,610 | 4/1976 | Little | 426/39 |
| 4,066,791 | 1/1978 | Corbin, Jr. | 426/39 |
| 4,129,387 | 12/1978 | Grange et al. | 366/119 |
| 4,264,636 | 4/1981 | Metz | 426/551 |
| 4,352,571 | 10/1982 | Grange et al. | 366/127 |
| 4,352,826 | 10/1982 | Pearline et al. | 426/39 |
| 4,374,152 | 2/1983 | Loter | 426/39 |
| 4,416,905 | 11/1983 | Lundstedt et al. | 426/34 |

FOREIGN PATENT DOCUMENTS 1247415 9/1971 United Kingdom .

OTHER PUBLICATIONS

"Sonic Systems Application Data", Sonic Corporation, One Research Drive, Stratford, CT 06497 (No Date).

Primary Examiner—Marianne Cintins
Attorney, Agent, or Firm—Kinney & Lange

[57] ABSTRACT

A protein product is produced by a process that includes introducing a protein-containing fluid and a reactant stream containing a component reactive with the protein, such as an acid through a resonating chamber. The protein-containing fluid and acid are introduced into the chamber at a velocity and pressure which causes instantaneous mixing of the protein-containing fluid with the acid to form an acidified mixture. The acid is introduced into the chamber in a ratio such that the pH of the protein-containing fluid is lowered past the isoelectric point of the protein.

36 Claims, 3 Drawing Sheets

PROCESS FOR PRODUCING A PROTEIN PRODUCT

This is a Continuation of application Ser. No. 06/823,304, filed Jan. 28, 1986, (now abandoned).

BACKGROUND OF THE INVENTION

1. Field of the Invention.

The present invention relates to a process for producing a protein product using a resonating chamber.

2. Description of the Prior Art.

Prior art processes have lowered the pH of protein solutions in a variety of ways to try to produce a suitable curd. For example, the manufacture of cheese cultures of acid-forming bacteria are frequently used, either separately or in conjunction with coagulating enzymes and/or heat to produce the desired type of curd. An alternative to using acid forming bacteria to form acid cheeses such as Cottage, Cream, and Baker's cheese is to directly acidify the milk. However, the direct acidification of milk has always been limited by the problem of localized precipitation or coagulation of the protein, which produces an unusable product.

An example of one approach that has been used to avoid the localized coagulation problem is to directly acidify cold milk with food grade acid until the milk pH is just above a critical point where further acid addition will cause coagulation, usually about pH 5.2 in milk. Then an acidogen is uniformally dispersed throughout the milk, and the milk allowed to stand in a quiescent state until the acidogen lowers the milk pH to the isoelectric point of casein, the major milk protein, to produce a curd. The Hammond U.S. Pat. No. 2,982,654 describes the use of what is now a well known acidogen, glucono-delta-lactone. The Corbin, Jr. U.S. Pat. No. 3,340,066, although making a buttermilk product, also adds acid directly to the milk, lowering the pH to a range between about 4.8 to 5.1 and then permitting the acidogen to lower the pH of the milk to about 4.2 to about 4.5. Other processes using an acidogen to lower the pH below the coagulation point of the milk include the Corbin, Jr. U.S. Pat. No. 4,066,791, the Metz U.S. Pat. No. 4,264,636, the Pearline et al U.S. Pat. No. 4,352,826, and the Loter U.S. Pat. No. 4,374,152.

Another process similar to the process of adding acidogen is the process of directly adding acid to cold milk until the Ph is reduced to approximately 5.2, and then adding an acid-producing enzyme which lowers the pH to the isoelectric point. The Foster, Jr. et al U.S. Pat. No. 3,172,767, the Little U.S. Pat. No. 3,406,076, the Corbin, Jr. U.S. Pat. No. 3,620,768 and the Loter et al U.S. Pat. No. 3,882,250 disclose variations of such a process for the production of cheese curd.

Still another method used in the production of cheese curd includes the direct acidification of the milk after the milk has been cooled to a temperature where coagulation will not occur. The milk is then heated whereupon the coagulation occurs. One such process is disclosed in the Ernstrom U.S. Pat. No. 3,298,836. Another variation of cooling, acidifying and then heating the milk is discussed in the British Patent to Battelle Development Corporation 1,247,415. In the British Battelle Patent, a proteolytic enzyme is also added to effect coagulation.

The Little U.S. Pat. No. 3,792,171 describes a process wherein solid acid particles are treated with a coating that will disperse or dissolve in the milk at a rate that delays the dissolution of the acid particles and effects relatively slow and uniform acidification.

The Little U.S. Pat. No. 3,359,116, although describing a process for the making of a sour cream-type product or cream cheese, adds acid to a milk that has been stabilized using a vegetable gum or gelatin.

In another Little U.S. Pat. No. 3,953,610 a process is disclosed for the direct acidification of milk wherein the milk is mixed at a high velocity by a propeller-type agitator. Acid is sprayed on the milk at a location of high velocity.

The Goujard U.S. Pat. No. 3,845,226 discloses a process that produces a very fine, non-granular curd. The process acidifies milk by mixing with the milk an acidifed serum that includes whey that has been acidified to a pH range of between 0.5 to 2.5 by electrodialysis. A sufficient amount of the serum is added to lower the pH of the milk below the isoelectric point of casein. The serum and the milk are mixed in a mixer.

In the recent Lundstedt et al U.S. Pat. No. 4,416,905, a method is described for the production of cultured dairy products, such as buttermilk, yogurt or sour cream. The milk is fermented using a bacterial fermentation culture. The fermentation of the medium is allowed to proceed for sufficient time to achieve a pH in the range of 6.0 to about 4.9, at which time the milk is cooled to reduce the fermentation rate. Then the pH is lowered to 4.7 or less using food grade acids.

SUMMARY OF THE INVENTION

The present invention includes a process for continuously reacting protein solution preferably by direct acidification to produce food products. The process includes introducing the protein-containing fluid and a reactant stream preferably including a food grade acid in a resonating chamber, exposing the mixture to a frequency in the ultrasonic range to effect uniform mixing of substantially all of the protein-containing fluid with the acid. The acid is provided in a ratio such that the pH of the protein-containing fluid is lowered to the desired level, including pH values at or below the isoelectric point of the protein. Manipulation of the protein pH by the invention allows direct acidification to the isoelectric point of the protein at favorable processing temperatures for the formation of a continuous curd.

DETAILED DESCRIPTION OF THE PREFERRED EMBODIMENTS

The present invention includes a process for the direct acidification of a protein-containing fluid, such as a fluid in a continuous process, by mixing a protein solution with a reactant stream containing a component reactive with the protein such as a food grade acid in a sonic chamber. The resulting product is a coagulated protein reacted product useful as a food product, such as cheese or a cheese-type base.

The protein stream such as milk or milk-derived fluid is introduced into a device that exposes the stream to an ultrasonic frequency. Preferably, the device includes a chamber wherein the milk and the acid are forced through an orifice in a high pressure stream. The stream impinges on an edge of a flat blade, causing the blade to vibrate at an ultrasonic frequency. The vibration of the blade at an ultrasonic frequency results in instantaneous uniform mixing, lowering the pH of the milk or milk-derived fluid to or below the isoelectric point of casein and causing the protein to precipitate to form a coagulum useful as a food product. Due to the instantaneous mixing of the acid with the milk or milk-derived fluid, little if any, localized coagulation occurs.

One suitable sonic device is produced by Sonic Engineering Corporation of Stratford, Connecticut. Sonic chambers produced by Sonic Engineering Corporation previous to the present invention have been used to mix, homogenize, disperse and emulsify various compounds in the cosmetic, food, drug and various other chemical industries. However, the direct acidification of protein to form a coagulum suitable for a food product such as a cheese or cheese base product has heretofore been unknown.

Figure 1:
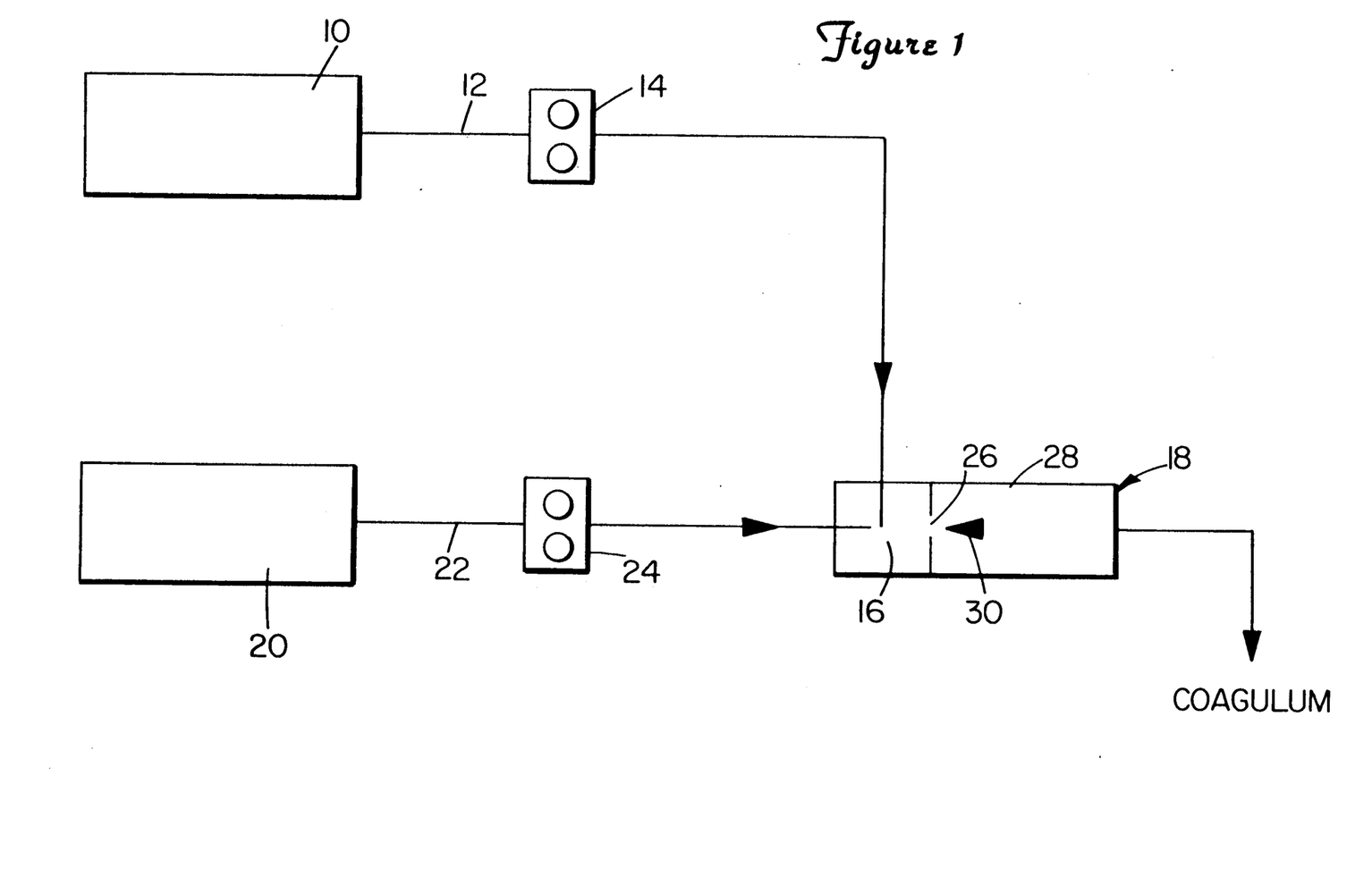
FIG. 1 is a diagrammatical view of the process of the present invention.

In FIG. 1, a schematic diagram illustrates the process of the present invention. A tank 10 contains a protein-containing fluid. Examples of a protein-containing fluid suitable for use in the process of the present invention includes, but is not limited to, whole milk, skim milk, cream, buttermilk, milk condensed by heat or reverse osmosis, whey, condensed whey, whey protein concentrate, yogurt, ultrafiltered retentates of whole or skim milk, fermented milk products, molten processed cheese, cheese slurries, casein solutions, uncoagulated egg albumen, uncoagulated blood, soy milk, meat slurries, cereal protein slurries, and single cell microbial protein. The protein-containing fluid may include or be mixed with a suitable fat source, such as milk fat, cream, vegetable oils or animal fats. The following description will refer to a milk or milk-derived fluid and is not to be construed as limiting the present invention to such.

The protein stream such as milk or milk-derived fluid may be in a heated state, for example, 90° F.-95° F. although processing temperatures of 140° F. are possible, or may be in a cooled state, such as 40° F. depending on the required consistency of the food product. The milk or milk-derived fluid is pumped through suitable conduit 12 by preferably a positive displacement pump 12 into a preintroduction chamber 16 of an ultrasonic device 18.

A tank 20 contains a coagulating mixture for coagulating the milk or milk-derived fluid. A food grade acid is preferred as the coagulating agent and the type of acid used will depend upon the type of product desired. Examples of suitable acids include, but are not limited to, lactic, acetic, butyric, citric, maleic, tartaric, hydrochloric, nitric, carbonic, palmitic, sulfuric or proprionic acid. In addition, other ingredients may be included with the acid to produce a variety of products and include such additives as microbial starter cultures, coagulants, salt, flavors, flavor-producing enzymes, colors, fruits, additional oils, and/or protein sources, processed cheese emulsifiers. Also, coagulants can be introduced without acid for subsequent coagulation of the protein. The mixture is conveyed from the tank 20 through a suitable conduit 22 and is pumped with a positive displacement pump 24.

The device 18 is a two-stage reactor having a preintroduction chamber 16, an orifice 26, a sonic chamber 28, and a flat blade 30 within the sonic chamber 28. The acid and the milk or milk-derived fluid is forced through an orifice 26 by pressure produced by the positive displacement pump 24. The acid and the milk or milk-derived fluid are forced through the orifice in such a manner as to produce a high pressure jet stream. The jet stream impinges on the edge of the flat blade 30, causing the blade to vibrate at ultrasonic frequencies. The mixing of the acid with the protein solution such as milk or milk-derived fluid is substantially uniform and may cause almost immediate coagulation of the solution within the sonic chamber to form a suitable coagulum useful as a food product.

The ingredient stream and the protein stream are forced through the orifice 26 under pressure and are joined together forming a high pressure stream that converges a very short distance from the orifice. The shape of the high pressure stream is controlled by the orifice design to create extreme turbulence that promotes high shear forces between the two feed streams, uniformly dispersing the ingredients.

The rate of reaction is further enhanced by placing a vibrating blade downstream. This blade absorbs energy causing the blade to oscillate at high frequencies. A pressure drop causes the blade to vibrate at ultrasonic frequencies, inducing high cavitation. The combined effects of the jet vortex and the vibrating blade increase the rates of reaction between the incoming streams to promote continuous product formation. In the case of the present invention, the reaction time between the protein stream and the ingredient stream becomes essentially instantaneous, nullifying the effects of localized coagulation and allowing the manufacture of a curd-like product suitable as a food base. The product is formed at previously unobtainable temperatures and speeds, while the pH may be reduced by direct acidification to levels previously impossible to obtain.

The residence time the feed streams in the device from the point of entry at the orifice 26 to the formation of a suitable coagulum is usually less than 0.628 seconds. In the described ultrasonic device, the blade may be adjusted closer to the orifice, decreasing the residence time. In addition, the velocity of the high pressure stream through the orifice may be adjusted to decrease the residence time.

Figure 2:
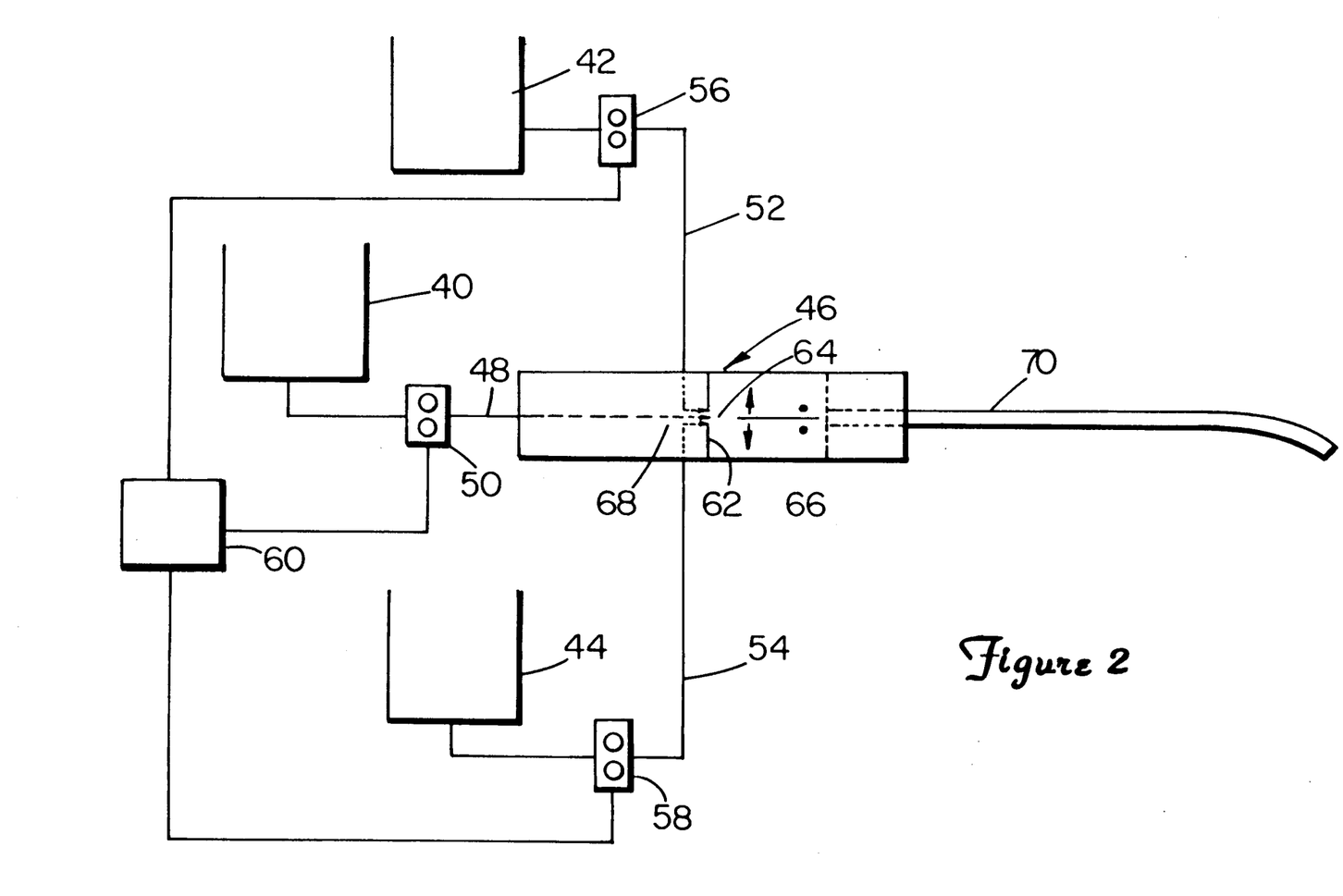
FIG. 2 is a diagrammatical view of an alternative embodiment of the present invention.

An alternative embodiment of the process of the present invention is schematically illustrated in FIG. 2. The process includes a tank 40 containing a protein-containing solution, such as was described with respect to tank 10 of FIG. 1. The solution in tank 40 contains a selected fat/protein ratio. A tank 42 contains a coagulating mixture, such as the acids that were described with respect to tank 20 in FIG. 1. A third tank 44 contains additives, such as microbial starter cultures, coagulants other than pure acids, salts, flavors, flavor-producing enzymes, colors, fruits, additional oils and/or protein sources, processed cheese emulsifiers, cheese powder and dried products such as ultrafiltered milk retentate, non-fat dried milk and whey protein concentrate.

An ultrasonic device 46, similar to the device 18 of FIG. 1, is used to mix the three streams to produce a coagulum. The tank 40 is connected by conduit 48 to the ultrasonic device and the solution from tank 40 is pumped to the ultrasonic device by pump 50. Similarly, tanks 42 and 44 are fluidly connected to the ultrasonic device by conduits 52 and 54, respectively, and the solution of each respective tank is pumped by pumps 56 and 58, respectively, to the ultrasonic device 46. The pumps 50, 56 and 58 are controlled by a regulating system 60. All pumps are high pressure pumps operable within the range of 400 psi to 1200 psi.

The ultrasonic device 46 includes an orifice 62, a resonating chamber 64 and a vibrating element 66. The solutions from the tanks 40, 42 and 44 are fed into a preintroduction chamber 68 and then forced through the orifice 26 into the sonic chamber 64 in such a manner as to produce a high pressure stream. When the high pressure stream impinges on the vibrating element 66, creating ultrasonic frequencies within the chamber, the solutions are instantaneously mixed causing almost immediate coagulation. The coagulum exits the device 46 through a suitable conduit 70.

The process of the present invention is useful in producing products such as cheese, cheese base products, cheese sauce, processed cheese, processed cheese food, processed cheese sauce, processed cheese product, enzyme modified cheeses. It has been demonstrated that the nearly instantaneous mixing of the protein stream and ingredient stream in this process results in little, if any, localized coagulation. The process of the present invention eliminates the need for vats, cultures, and the requirements of having the protein and fat solution sit in a quiescent state for the production of a suitable coagulum. Product properties are controlled by the composition of the protein and ingredient streams, the flow rate of each stream as controlled by the feed pumps, the temperatures of the protein and ingredient stream, and the pressure and mixing frequency at which the streams are mixed. The process allows the pH of the curd to be decreased to or below the isoelectric point of casein.

Figure 3:
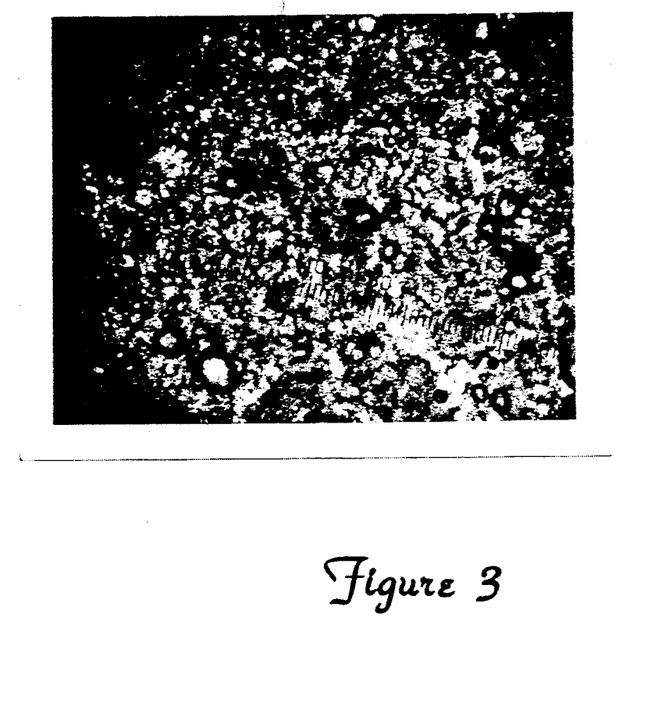
FIG. 3 is a photomicrograph of coagulum produced by a prior art process magnified 100 times.
Figure 4:
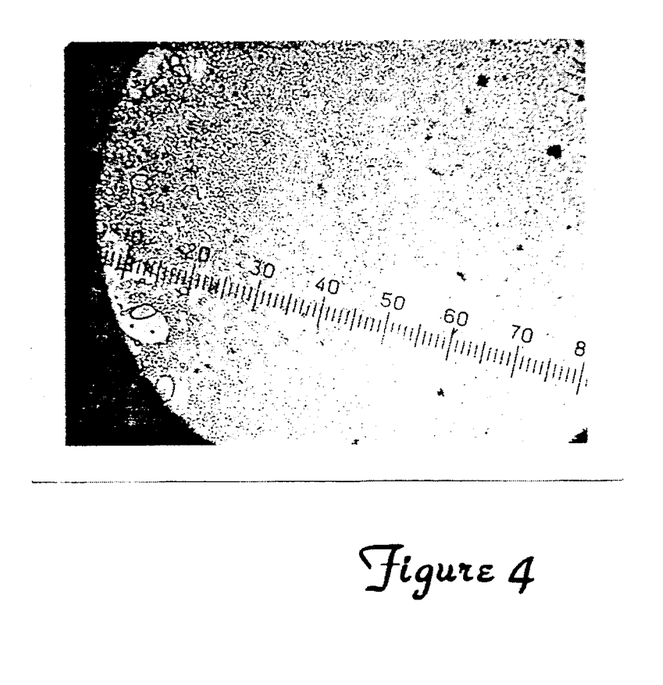
FIG. 4 is a photomicrograph of coagulum produced by the present invention magnified 100 times.

FIG. 3 is a photomicrograph of an acid precipitated coagulum made from concentrated skim milk by adding acid to the concentrated skim milk in a quiescent state, as in the prior art. FIG. 4 is a photomicrograph of an acid precipitated product made from concentrated skim milk by direct acidification using the process of the present invention. Both photomicrographs are 100X and each division of the scale that is superimposed on the photomicrograph is approximately 4.8 microns. The pH of the coagulum in FIG. 3 is approximately 5.2 and the pH of the coagulum in FIG. 4 is approximately 5.1. The coagulum in FIG. 3 has a highly nonuniform particle size distribution, as is easily seen from the photomicrograph. The coagulum produced by the process of the present invention has a highly uniform particle size distribution, with the largest particle being approximately no greater than 4.8 microns, or one division of the scale in the photomicrograph. The uniform particle size produces a very smooth product on a reliable basis which is highly desirable.

There are no bacterial failures using the process of the present invention since direct acidification causes coagulation. Furthermore, since the addition of acid is on a continuous basis, batch-to-batch variation of product is eliminated.

The following examples are illustrative only and are not intended to limit the present invention:

EXAMPLE 1

In a pilot plant, 42 lbs. of commercially available nonfat dry milk was reconstituted with 58 lbs. of water and then heated to 120° F. to make 90 lbs. of concentrated skim milk. Concentrated phosphoric acid (85%) was diluted with three parts water separately at 75° F. The concentrated skim milk and the diluted phosphoric acid were separately fed into a sonic device known as a model A Sonolator manufactured by Sonic Engineering Corporation of Stratford, Connecticut, and then processed through the sonic chamber at a ratio of 0.5 lbs. of skim milk to 9 ml. of phosphoric acid. A cheese-like coagulum was produced having a final pH of 5.2 and about 44% total solids. The coagulum was similar to a soft, acid precipitated cheese. The Sonolator was operated at a pressure of 800 psi using 0.004 orifice. A 0.008 orifice was then used at an operating pressure of 800 psi. Both orifices produced an acidified condensed skim milk with a pH of 5.2.

EXAMPLE 2

In a pilot plant situation, the sonic device was used to make a cottage cheese-like product. 27.5 lbs. of nonfat dry milk was reconstituted with 72.5 lbs. water and heated to 125° F. and used as one stream to make a condensed skim milk. Separately concentrated phosphoric acid (85%) was diluted with three parts water at 75° to prepare the acid stream. The skim milk stream and the phosphoric acid stream were separately fed into the model A Sonolator operating at a pressure of 600 psi and containing a 0.008 orifice. Both streams were instantly mixed to produce a coagulum on a continuous basis. Upon cutting the coagulum into the Cottage cheese sized particles, the product was similar to cottage cheese curd.

EXAMPLE 3

In a pilot plant situation, the sonic device was used to make a Cream cheese-like product. In the experiment, 16.89 lbs. of dried ultrafiltered skim milk was reconstituted with 31.27 lbs. of water and 51.84 lbs. of 40% fat cream, to produce a low lactose high protein and fat solution having the exact composition of the finished product and used as one stream. Separately, concentrated phosphoric acid (88%) was diluted with three parts of water at ambient temperature to use as the coagulating stream. The protein and fat stream was heated to 106° F. and then both the protein and fat stream and the acid stream were separately fed into a model A Sonolator having an orifice of 0.006 and an operating pressure of 400 psi. The addition of 38.5 ml. acid solution per liter of protein/fat solution reduced the milk pH from 6.6 to 5.2 producing a soft, homogeneous Cream cheese-like product. Adjusting the feed rates further allowed the instantaneous production of acceptable products with pH levels of 4.6, 4.0 and 3.6.

EXAMPLE 4

In a pilot plant situation, the sonic device was used to make a Cheddar or American-type cheese product. Concentrated lactic acid (88%) was diluted with four parts of water and then mixed with 0.05 ml. of rennet and 5 g. of salt at 75° F. to be used as the coagulating stream. A separate protein fat stream was prepared with milk ultrafiltered to a 5-to-1 concentration or a total solids content of about 40%.

Both the acid, rennet and salt ingredient stream and the protein and fat stream were fed into a sonic device known as a triplex 2,000-A Sonolator manufactured by Sonic Engineering Corporation of Stratford, Connecticut having a 0.003 orifice and operating at 800 psi. The process instantaneously produced a rennet coagulated curd having a pH of 5.2. This curd was suitable for packaging as a soft Cheddar or American type cheese product.

EXAMPLE 5

Skim milk was processed by ultrafiltration and then dried to produce a low lactose, high protein, high solids retentate. Whole milk was separately processed by ultrafiltration to produce a low lactose, high protein, high fat retentate. The skim milk retentate was then mixed with the whole milk retentate to produce a mixture having the approximate protein, fat and lactose composition of Cheddar cheese. In this example, 6.65 lbs. of whole milk retentate was combined with 7.45 lbs. of skim milk rententate to produce 14.10 lbs. of high protein and fat ingredient stream. Separately, one ml. of rennet was mixed with 400 ml. of water and then 100 ml. of concentrated lactic acid (88%) was added to produce the acid stream. Both the protein and fat stream and the acid stream were then fed into a model 2000-A Sonolator having a 0.003 orifice and an operating pressure of 400 psi. Both streams were instantaneously mixed, producing a smooth, completely coagulated product on a continuous basis with the total solids of Cheddar cheese. The texture and taste of this product also being quite similar to Cheddar cheese.

EXAMPLE 6

Whole milk was processed by ultrafiltration to produce a high protein, high fat, low lactose and high solids feed stream. The whole milk retentate was then mixed with dry cheese powder with a high speed blender (manufactured by Tekman of Cincinnati, Ohio) to form a solution for use as a protein stream. A second separate ingredient stream was made by mixing 400 ml. of water with 100 ml. of concentrated phosphoric acid (88%) and one ml. of calf rennet manufactured by Hansons Inc. of Milwaukee, Wisconsin. Both streams were then introduced into the model 2000-A Sonolator used in Example 4 having 0.003 orifice and an operating pressure of 400 psi. The two streams were instantly mixed and coagulated to produce a highly flavored, high solids cheese-like product.

EXAMPLE 7

Whole milk was processed by ultrafiltration to produce a high protein, high fat, low lactose and high solids retentate to be used as a protein and fat stream. A separate ingredient stream was prepared by mixing 400 ml. of water with 100 ml. of concentrated lactic acid (88%) and one ml. of calf rennet. The protein and fat stream was heated to 140° F. Both streams were separately pumped into the 2000-A Sonolator used in Example 4 having a 0.003 orifice and an operating pressure of 400 psi. A very soft coagulated curd suitable for use as a soft cheese product was instantly produced.

EXAMPLE 8

Whole milk was processed by ultrafiltration to produce a high protein, high fat, low lactose and high solids ultrafiltered retentate to be used as one stream. The retentate was heated to 120° F. A separate ingredient stream was prepared by mixing 400 ml. of water and 100 ml. of sulphuric acid at 75° F. Both streams were introduced into the model 2000-A Sonolator used in Example 4 with a 0.003 orifice and operating at 400 psi so as to produce a coagulated product with a pH of 2.6. During processing, no protein burning or localized coagulation occurred from the use of this strong acid or large pH reduction and a liquid noncoagulated product was produced.

EXAMPLE 9

To produce an acidified milk product, skim milk was pasteurized by heating to 162° F. for 16 seconds. Separately, concentrated lactic acid (88%) was diluted with three parts water. The skim milk was heated to 105° F. and fed into a model A Sonolator as one stream and the diluted lactic acid was fed into the Sonolator as another stream. A 0.004 orifice and an operating pressure of 600 psi was used. The diluted acid stream was fed into the Sonolator at three separate rates so as to decrease the pH of the skim milk to 4.5, 4.0 and 3.6. Milk coagulation did not occur at any of the pH levels so that an acceptable cultured buttermilk-type product was produced. A more buttermilk-type flavor could have been added to the product by mixing 0.01% starter distillate into the skim milk before acid addition.

EXAMPLE 10

A yogurt-type product was produced by reconstituting 63 grams of extra grade nonfat dry milk with 437 grams of distilled water. The mixture was heated in the steam bath to 185° F. and held there for 45 minutes. Then the skim milk was cooled to 105° F. Separately, concentrated lactic acid (88%) was diluted with three parts of water. Both the skim milk stream and the acid stream were added separately to a model A Sonolator having a 0.004 orifice and operated at 600 psi. The rate of acid addition was adjusted to produce a product with a pH of 4.1 forming a liquid yogurt product.

A solid yogurt product was produced by decreasing the operating pressure of the Sonolator to 400 psi. Calcium chloride at 0.02% by weight and rennet at 0.01% was added to the product from the Sonolator. The product was then allowed to quiescently set to produce the solid yogurt product.

EXAMPLE 11

A milk-soy protein cheese product was produced by mixing 40 parts of ultrafiltered whole milk retentate having a 40% solids content with 60 parts of soy milk. The mixture was then heated to 150° F. A coagulating mixture was prepared separately by combining three parts of distilled water with one part of concentrated lactic acid (88%). Rennet at 0.25% by weight, 2% salt by weight, and 0.3% calcium chloride was added to the coagulating mixture. The milk-soy protein mixture was fed as one stream and the coagulating mixture was fed as another stream into a model A Sonolator having a 0.004 orifice and at an operating pressure of 800 psi. The coagulating mixture was added at a rate capable of reducing the pH of the milk-soy protein mixture to 5.2, 4.6 and 3.3. A soft, smooth coagulum was produced at the 5.2 pH, similar to cream cheese. A firm, though grainier, coagulum was produced at the 3.3 pH. The 4.6 pH produced a product having a suitable cream cheese texture. The operating pressure was also reduced to 400 psi at pH levels of 5.2, 4.6 and 3.3. At all the pH levels, with the reduced operating pressure of 400 psi, similar products were produced that were characterized with reduced wheying off.

EXAMPLE 12

A soy protein cheese was produced by preparing a soymilk with a 12% solids product that was heated to 185° F. to be used as one stream. An acid solution was prepared separately by mixing one part of concentrated lactic acid (88%) with three parts of distilled water and adding 0.3% calcium chloride by weight to the mixture for use as the other stream. The heated soymilk stream and the acid stream were added to a model A Sonolator having a 0.004 orifice and being operated at 600 psi. The acid stream was added at a rate that reduced the soymilk pH to 5.6. A finely dispersed curd was produced.

The Sonolator operating pressure was then reduced to 400 psi and the calcium chloride in the acid stream was replaced with calcium sulphate and the lactic acid was replaced with acetic acid. A coarser curd product was then produced. The coarser curd product would be suitable to produce a soy cheese by collecting the curd with a cheese cloth and processing it into a soy cheese by traditional tofu procedures.

Although the present invention has been described with reference to preferred embodiments, workers skilled in the art will recognize that changes may be made in form and detail without departing from the spirit and scope of the invention.

What is claimed is:

1. A process for producing a protein-containing food product, the process comprising:
   introducing a protein-containing stream having a coaguable protein and a reactant stream containing a component for coagulating the protein, the two streams having concentrations and proportions effective for coagulation of the protein under uniform dispersion conditions, through a resonating chamber, resonating at an ultrasonic frequency causing instantaneous mixing of both streams such that a coagulum suitable as a food product is subsequently formed.

2. The process of claim 1 wherein the protein-containing stream is a milk or milk-derived fluid.

3. The process of claim 1 wherein the protein-containing stream comprises animal-derived proteins.

4. The process of claim 1 wherein the protein-containing stream comprises plant-derived proteins.

5. The process of claim 1 wherein the protein-containing stream comprises milk-derived proteins.

6. A product produced by the process of claim 1 having a uniform particle size.

7. A product produced by the process of claim 6 wherein the largest particle size is less than approximately 4.8 microns.

8. The process of claim 1 wherein the component for coagulating the protein is a food grade acid.

9. The process of claim 8 wherein the concentration and proportion of the food grade acid is sufficient to reduce the pH of the resultant mixture to the isoelectric point of the protein, creating a protein curd.

10. The process of claim 1 wherein the reactant stream comprises a sufficient mixture of food grade acid and coagulating enzyme to coagulate the protein and produce a coagulum wherein the coagulum is a curd.

11. The process of claim 8 wherein sufficient acid is added to the protein solution so that application of heat will produce a denatured protein curd.

12. The process of claim 1 and further comprising introducing a ripening agent with the protein-containing stream and the reactant stream in the resonating chamber.

13. The process of claim 1 and further comprising introducing a flavoring agent with the protein-containing stream and the reactant stream in the resonating chamber.

14. The process of claim 1 and further comprising introducing an emulsifying agent with a protein-containing stream and the reactant stream in the resonating chamber.

15. The process of claim 1 and further comprising introducing a food grade preservative in the resonating chamber.

16. The process of claim 1 wherein the protein-containing stream comprises microbial-derived protein.

17. The process of claim 5 wherein the protein-containing stream further comprises a plant-derived protein.

18. A process comprising:
   combining a protein-containing stream having a coaguable protein with a reactant stream containing a component for coagulating the protein, the two streams having concentrations and proportions effective for coagulation of the protein under uniform dispersion conditions, and subjecting the combined streams to an environment in which both streams are subjected to a resonating medium in the ultrasonic range such that both streams are intimately mixed to form a subsequent coagulum suitable as a food product.

19. The process of claim 18 wherein the protein-containing stream is a milk or milk-derived fluid.

20. The process of claim 18 wherein the protein-containing stream comprises animal-derived proteins.

21. The process of claim 18 wherein the protein-containing stream comprises plant-derived proteins.

22. The process of claim 18 wherein the protein-containing stream comprises milk-derived proteins.

23. A product produced by the process of claim 18 having a uniform particle size.

24. A product produced by the process of claim 23 wherein the largest particle size is less than approximately 4.8 microns.

25. The process of claim 18 wherein the component for coagulating the protein is a food grade acid.

26. The process of claim 25 wherein the concentration and proportion of the food grade acid is sufficient to reduce the pH of the resultant mixture to the isoelectric point of the protein, creating a protein curd.

27. The process of claim 18 wherein the reactant stream comprises a sufficient mixture of food grade acid and coagulating enzyme to coagulate the protein and produce a coagulum wherein the coagulum is a curd.

28. The process of claim 25 wherein sufficient acid is added to the protein solution so that application of heat will produce a denatured protein curd.

29. The process of claim 18 and further comprising introducing a ripening agent into the resonating medium.

30. The process of claim 18 and further comprising introducing a flavoring agent into the resonating medium.

31. The process of claim 18 and further comprising introducing an emulsifying agent into the resonating medium.

32. The process of claim 18 and further comprising introducing a food grade preservative in the resonating medium.

33. The process of claim 18 wherein the protein-containing stream comprises microbial-derived protein.

34. The process of claim 22 wherein the protein-containing stream further comprises a plant-derived protein.

35. A process for producing a protein-containing food product, the process comprising:

introducing a protein-containing stream comprising a protein having an isoelectric point at which the protein coagulates and an acid-containing stream, the two streams having concentrations and proportions such that a combination of the two streams has a pH below the isoelectric point of the protein, through a resonating chamber, resonating at an ultrasonic frequency that causes instantaneous mixing of both streams such that a non-coagulated protein, acidified below the isoelectric point of the protein is produced.

36. A protein-containing food product produced by the process of claim 35.

* * * * *

UNITED STATES PATENT AND TRADEMARK OFFICE
CERTIFICATE OF CORRECTION

PATENT NO. : 5,006,349

DATED : April 9, 1991

INVENTOR(S) : Donald G. Dahlstrom et al.

It is certified that error appears in the above-identified patent and that said Letters Patent is hereby corrected as shown below:

ON THE TITLE PAGE:

Under [75] Inventors: please delete "Barney J. Gaffney" and insert --Bernard J. Gaffney--.

Signed and Sealed this

Twentieth Day of October, 1992

Attest:

DOUGLAS B. COMER

*Attesting Officer*    *Acting Commissioner of Patents and Trademarks*